INVENTOR.
Paul T. Lofshult
BY Sam J. Slotsky
ATTORNEY

United States Patent Office 3,233,683
Patented Feb. 8, 1966

3,233,683
STALK AND ROOT CUTTER AND MULCHER
Paul T. Lofshult, Sloan, Iowa
Filed Feb. 14, 1964, Ser. No. 344,848
1 Claim. (Cl. 172—71)

My invention relates to a stalk and root cutter and mulcher.

An object of my invention is to provide a device in which the stalks lying close to the ground will be guided or fed into a chopping device, and so that the stalks themselves will be chopped up to thereby increase the mulching action.

A further object of my invention is to provide such an arrangement whereby the earth adjacent to the stalk guiding arrangement will be thrown onto the chopped material so that the earth will thoroughly cover the chopped stalk material, and whereby this mixture will be deposited upon the ground in a form that will not be readily blown away by the winds and the like.

A further object of my invention is to provide a device in which a series of plow blades which are used to provide the above mentioned results can be adjustably regulated laterally as well as vertically, and whereby any number of the same can be used.

Figure 1:
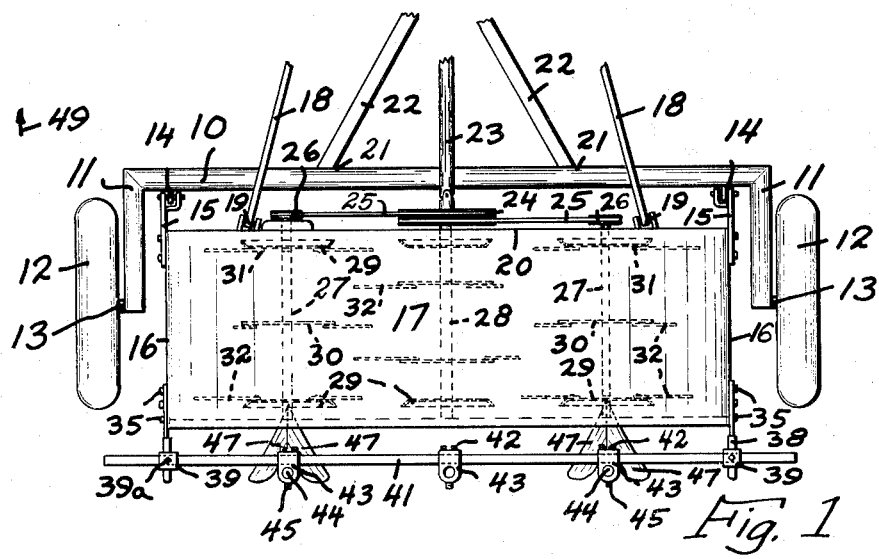
Figure 2:
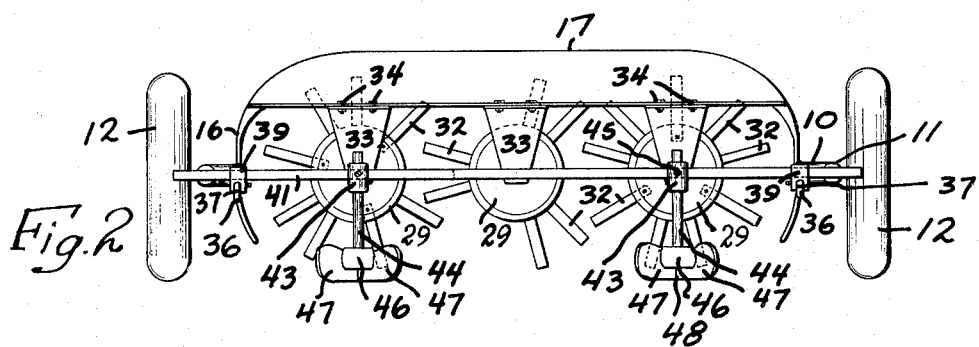
Figures 3, 4:
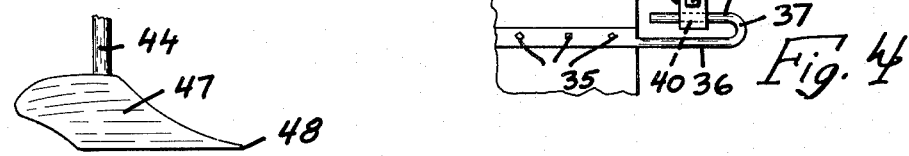

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a plan view of my device,
FIGURE 2 is a rear view of FIGURE 1,
FIGURE 3 is an enlarged side elevation of one of the plows, and
FIGURE 4 is a further enlarged detail.

My invention contemplates the provision of a device which will insure that the major root portions of the stalks in a field will be removed from the ground and deposited onto the material chopped by the chopping unit ahead of the same.

I have used the character 10 to designate a laterally positioned framework portion to which are attached the rearwardly extending further portions 11, the character 12 indicating wheels journalled at 13 to the portions 11.

Pivotally attached at 14 are the bars 15 secured to the side walls 16 of a casing 17.

The character 18 indicates a pair of forwardly extending bars which are suitably secured to any type of desired arrangement which is provided to adjust the casing 17 vertically, the bars 18 being pivotally attached at 19 to the rear casing wall 20 of said casing.

Attached at 21 to the framework member 10 are the straps or bars 22 which are suitably secured to a tractor to draw the arrangement. The character 23 indicates a tractor driven shaft which is suitably secured to a double pulley 24 over which pass the belts 25, which belts 25 pass over the pulleys 26 which drive the shafts 27, the pulley 24 driving the central shaft 28.

The shafts 27 and 28 are secured to the members 29 and 30, and pivotally secured as at 31 to these members are the bars 32, the shafts 27 and 28 being suitably journalled within the lower ends of the members 33 (see FIGURE 2) which are secured at 34.

Attached at 35 to the side walls 16 are the brackets 36 (see FIGURE 4) which include the reversely curved portions 37, which continue into the portions 38, the character 39 indicating blocks which receive the portions 38 at 40, and received through the blocks 39 is a square-in-section laterally positioned rod 41.

Securely attached to the rod 41 by means of the set screws 42 are the further blocks 43, and received in the blocks 43 are the vertically positioned bars 44 which are secured thereto by means of the set screws 45, and attached to the bottom of the bars 44 are the members 46. Securely attached to the members 46 are a pair of converging plow blades 47 which terminate in the points 48.

The device operates in the following manner. As the arrangement travels forwardly in the direction of the arrow 49, the rotating bars 32 will chop and pulverize the stalks, and at the same time the blades 47 will remove the lower portions of the stalks and will raise said lower portions toward the bars 32. Also, the root portions and earth will be deposited over the chopped material by these blades 47, which will effectively prevent blowing away of the chopped material. Also it will be noted that the blades 47 will raise stalks which are normally too low to be reached by the chopping bars.

The blocks 43 permit attachment of any number of blade arrangements 47 as desired, and the set screws 42 permit any desired spacing, the set screws 45 providing for vertical adjustment of the blades 47, and if desired extra blocks 43 can be provided to accommodate other conditions. The additional set screws 39a provide means for attaching the blocks 39 securely to the transverse rod 41. The reversely curved portion 37 prevents the blocks 39 from falling off of the arrangement in case the set screws 39a are loosened, etc.

It should be understood that any type of chopping implement can be employed as well as the plow blades 47, the essential spirit of my invention pertaining to that feature wherein the members 47 carry and direct the lower portions of the stalks into the chopping mechanism.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A stalk and root cutter and mulcher comprising a mobile framework, a casing attached to said framework, said casing including a plurality of crop chopping units therein, means for driving said units, said chopping units being mounted for rotation about horizontally positioned longitudinally extending axes, said chopping units including radially positioned blades, plow members positioned behind said crop chopping units for directing crop stalks toward said chopping units, means for adjusting said plow members laterally and vertically, including a rearward laterally positioned bar, means for attaching said plows at laterally and vertically spaced positions beneath said bar, said plow members including pairs of plow blades converging forwardly toward each other, means for supporting said bar including side brackets attached to said framework, said side brackets including lower longitudinally positioned portions, and upper portions bent forwardly therefrom and extending parallel to said lower portions and being vertically spaced above said lower portions, slidable blocks attached to said upper portions, said laterally positioned bar being received through said blocks, screws threadably engaged with said blocks and bearing against said laterally positioned bar.

(References on following page)

References Cited by the Examiner

UNITED STATES PATENTS

| | | | |
|---|---|---|---|
| 486,661 | 11/1892 | Brickell | 172—58 |
| 1,030,156 | 6/1912 | Bermes | 172—49 |
| 1,510,294 | 9/1924 | Bertrand | 172—763 X |
| 1,743,836 | 1/1930 | Storey | 172—71 |
| 1,838,355 | 12/1931 | Benjamin | 172—763 X |
| 2,500,914 | 3/1950 | Sells et al. | 172—58 |
| 2,711,063 | 6/1955 | Hill | 172—58 |
| 2,734,440 | 2/1956 | Davis | 172—691 |
| 2,781,709 | 2/1957 | Caldwell et al. | 172—28 |
| 2,968,354 | 1/1961 | Berry | 172—28 |

ABRAHAM G. STONE, *Primary Examiner.*